United States Patent [19]
Levine

[11] Patent Number: 5,978,000
[45] Date of Patent: Nov. 2, 1999

[54] COMBINED CHART RECORDER AND DEVICE CONTROLLER

[76] Inventor: Matthew Levine, 7040 NW. 68th Dr., Parkland, Fla. 33067

[21] Appl. No.: 08/927,173

[22] Filed: Sep. 11, 1997

Related U.S. Application Data

[60] Provisional application No. 60/026,469, Sep. 17, 1996, and provisional application No. 60/027,476, Sep. 26, 1996.

[51] Int. Cl.[6] .................................................. G01D 15/16
[52] U.S. Cl. .............................. 346/62; 346/121; 346/123
[58] Field of Search .................................. 346/121, 131, 346/137, 133, 134, 123, 124, 62

[56] References Cited

U.S. PATENT DOCUMENTS

| | | | |
|---|---|---|---|
| 3,103,402 | 9/1963 | Stoops | 346/68 |
| 3,757,348 | 9/1973 | Hoopes | 346/33 R |
| 3,914,773 | 10/1975 | Harrower | 346/121 |
| 3,918,066 | 11/1975 | Fujita et al. | 346/17 |
| 4,074,272 | 2/1978 | Way et al. | 346/33 A |
| 4,353,076 | 10/1982 | Bohg | 346/65 |
| 4,603,396 | 7/1986 | Washizuka et al. | 346/65 |
| 4,977,409 | 12/1990 | Kanda | 346/23 |
| 5,019,838 | 5/1991 | McKinley et al. | 346/121 |
| 5,216,439 | 6/1993 | McCormack et al. | 346/65 |
| 5,268,581 | 12/1993 | Showalter | 250/566 |
| 5,442,188 | 8/1995 | Brimbal et al. | 250/566 |
| 5,576,741 | 11/1996 | Johnson et al. | 346/145 |

*Primary Examiner*—N. Le
*Assistant Examiner*—Anh T. N. Vo
*Attorney, Agent, or Firm*—Gifford, Krass, Groh, Sprinkle, Anderson & Citkowski, PC

[57] ABSTRACT

An improved chart recorder integrates a variety of flexible control functions, including the ability to program a plurality of set points, which are advantageously made visually apparent on the chart recorder paper and used for direct equipment control. In a preferred embodiment, a reversible stepper motor is used in conjunction with an operator input, enabling a user to incrementally advance one or more pens in two dimensions in conjunction with paper travel. The chart paper may further optionally include a machine-readable code containing chart-related information, including scale resolution, with the recorder being programmed to detect and interpret the machine-readable code and adjust pen movement to ensure compatibility with the scale resolution. By providing a single unit which both indicates set points and delivers control outputs in accordance therewith, ambiguity is removed as to which piece of equipment may be responsible in the event of a malfunction, since the chart recorder may, itself, communicate all relevant information.

14 Claims, 2 Drawing Sheets

COMBINED CHART RECORDER AND DEVICE CONTROLLER

REFERENCE TO RELATED APPLICATION

This application claims priority of U.S. provisional application Ser. No. 60/026,469, filed Sep. 17, 1996, and U.S. provisional application Ser. No. 60/027,476, filed Sep. 26, 1996, the entire contents of both applications are incorporated herein by reference.

FIELD OF THE INVENTION

This invention relates generally to chart recorders and, in particular, to an improved recorder which integrates control functions, including set-point input.

BACKGROUND OF THE INVENTION

Chart recorders have been slow to embrace certain technological innovations. One reason is that the operational environment of a typical recorder has become somewhat standardized over the years and resultantly resistant to change. In addition, those involved with system maintenance and chart interpretation have gotten used to proven equipment configurations, and have been more or less satisfied with the results.

However, as with many electromechanical systems, there are many advantages to be gained through increased integration and enhanced functionality. For example, whereas, traditionally, the recording and control aspects of a complete system have been kept separate, with the recorder performing no more than a monitoring function, improvements are possible through alternative architectures.

Specifically, with separate measurement and control, is may be difficult to readily ascertain the source of a problem, for instance, in an out-of-limit situation. Those responsible for manufacturing or maintaining the chart recorder may place blame for a malfunction on the equipment being controlled, whereas those involved in maintaining the equipment may counter that the chart recorder failed to record a critical reading when the problem occurred.

Separate monitoring and control has also evolved into arrangements whereby certain aspects of the equipment being controlled are routed to the recorder when, in fact, if the recorder were more operationally capable, more straightforward configurations could result. In current practice, for example, mechanically complicated transducers are often brought proximate to the recorder to facilitate a more direct interconnection or to provide a more accurate reading. Again, if the recorder were itself to adopt more comprehensive functionality, such sophisticated interfaces could be minimized or eliminated altogether.

SUMMARY OF THE INVENTION

The present addresses deficiencies of existing arrangements by providing a chart recorder which integrates a variety of flexible control functions. In a preferred embodiment, the invention takes the form of a circular chart recorder, and includes the ability to program into the chart recorder apparatus proper a plurality of set points which are advantageously made visually apparent on the chart recorder paper. The combined controller/recorder of the invention further includes driver electronics responsive to the program set points, which may be used to directly control equipment in accordance with the set points, or, alternatively, to provide other control functions, such as the activation of higher power switches, and so forth.

In a preferred embodiment, one or more light-emitting indicators are supported on the housing of the inventive apparatus to provide visual feedback as to functional status, including whether or not a particular driver relay has been activated. To assist in providing a visual marking on the recorder paper of set-point positions, a reversible stepper motor is preferably used in conjunction with an operator input, enabling a user to incrementally advance one or more pens in two dimensions in conjunction with paper travel. In addition, buttons may optionally be provided to bring about a manual switching of the control outputs, that is, to effectuate a manual override.

Owing to the flexibility of the hardware involved, an operator may set multiple set points, each providing a different output control function. As one example, in a pressure-related implementation, coincidence with a first over-pressure set point may be used to provide a first function, such as the turning off of a pump, whereas coincidence with a second over-pressure set point may be used to sound an audible alarm, and so forth. The invention is by no means limited to pressure, temperature or other traditional chart-recording functions, and may be used in any situation where a combined indicator/control apparatus would be beneficial. Broadly, by providing a single unit which both indicates set points and delivers control outputs in accordance therewith, ambiguity is removed as to which piece of equipment may be responsible in the event of a malfunction, since the chart recorder may, itself, communicate all relevant information.

DETAILED DESCRIPTION OF THE PREFERRED EMBODIMENT

Figure 1:
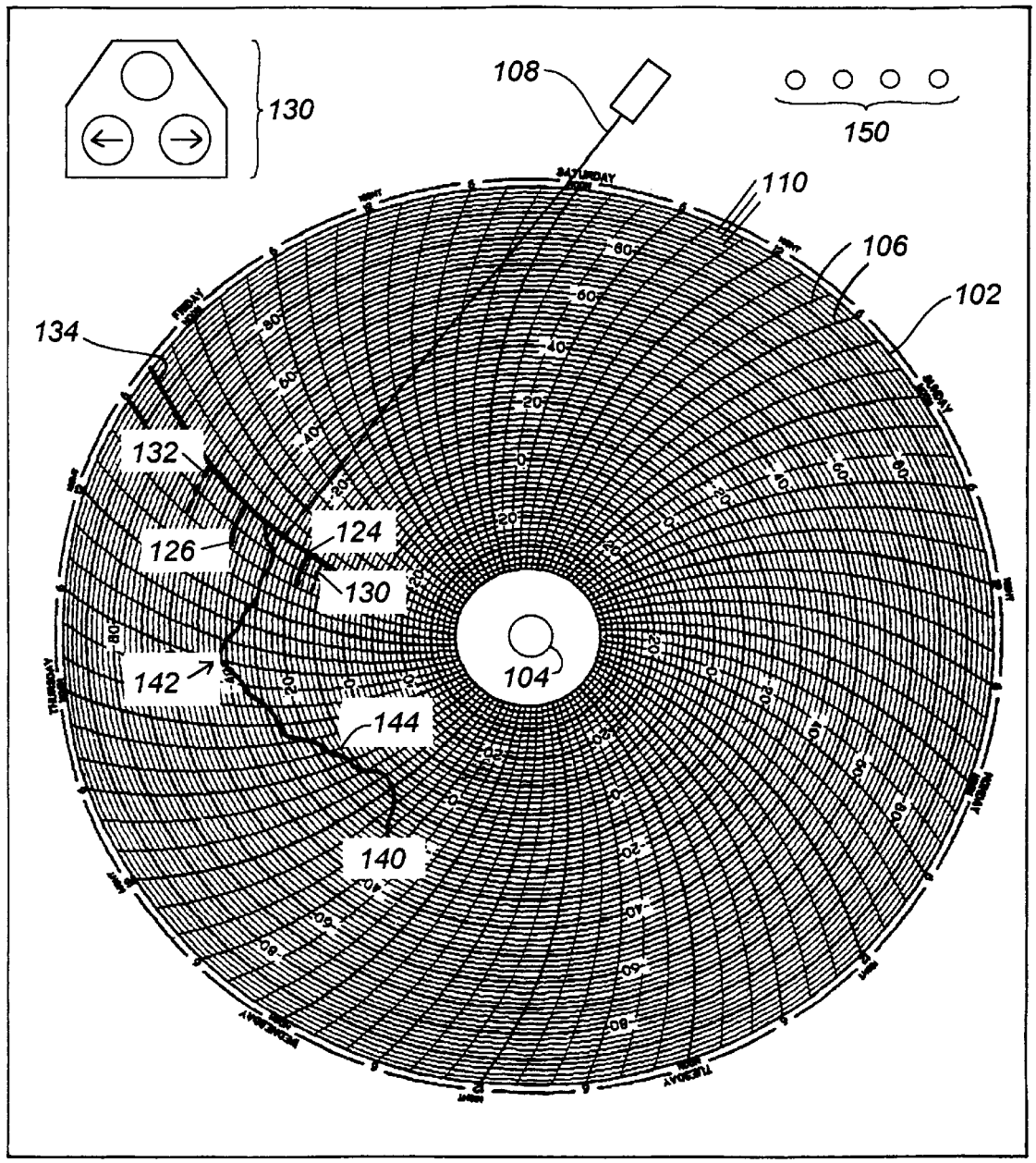
FIG. 1 is a view of a circular chart paper having marked thereon a plurality of set points along with an indication of an actual measurement according to the invention.

In FIG. 1, there is shown a piece of circular chart recording paper 102 which includes a central aperture 104 used to affix the paper to the instrument. On this paper there are a plurality of lines 106 which extend substantially from the center to the outside edge, along first dimension. The lines are typically curved, as shown, to accommodate the radius of the arc formed by the pen arm 108. These lines 106 are usually indicative of time, with the paper rotating uniformly in a particular direction, whereas the concentrically circular lines 110 representative of a second dimension, are usually indicative of a measured quantity, such as pressure, temperature, humidity, etc. Additional lines may be added between primary lines 106 and 110 for further gradations in terms of measurement. As mentioned, the invention is not limited in regard to the quantity being measured, nor is the invention constricted to the use of a circular chart recorder, as any type of pen/visual indicator system may be used, including a strip-chart type of arrangement.

Two short arcs 124 and 126 have been respectively placed on the paper by an operator using a keypad 130. During setup, according to the invention, the buttons on pad 130 were used to manually increment the pen 108 down to a value of 19, at which point the short arc 124 was automatically drawn by the apparatus to indicate a first lower set point value. By manually manipulating the pen 108 using the keypad 130, the pen was moved to first upper set point value of 44 and the short arc 126 was automatically drawn by the machine to provide a visual representation of this set point.

As mentioned previously, additional set points 131 and 132 may also be drawn in like manner, with the total number of such set points and outputs are limited only in terms of practicality. In each case, each set-point marker is preferably indicated by the operator first loosening the paper and rotating it to the correct time of day, with the stepper motor used to drive the paper being advanced in both forward and reverse directions to draw each mark and return to the set time. Although this is the preferred approach, due to the flexibility of the apparatus and the reversible nature of the motors involved, complete rotations of the paper may alternatively be used to make these markings. Also, the scale may change in either dimension of the paper, with the system keeping track of the resolution involved. For example, the greatest resolution may be recorded between primary set points, with less resolution outside this range.

Following the set-up mode just described, the instrument goes into an operational mode, with the pen 108 drawing a line 140 indicative of actual measurement. At point 142, it is noted that the line 140 reached the set point associated with point 126, but owing to the fact that the line 140 came back into range, it is clear that the instrument successfully generated a control signal to correct the situation. In a typical circumstance, a single relay may be toggled on and off, with the set points being indicative of hysteresis. At point 144, however, the line 140 went past the set point at line 124, which may be indicative of a problem with the equipment being controlled. In both cases, indicator lights 150 may be turned on and off in accordance with the reaching of each set point, which is also indicative that the output associated with that set point is being activated by the instrument.

Figure 2:
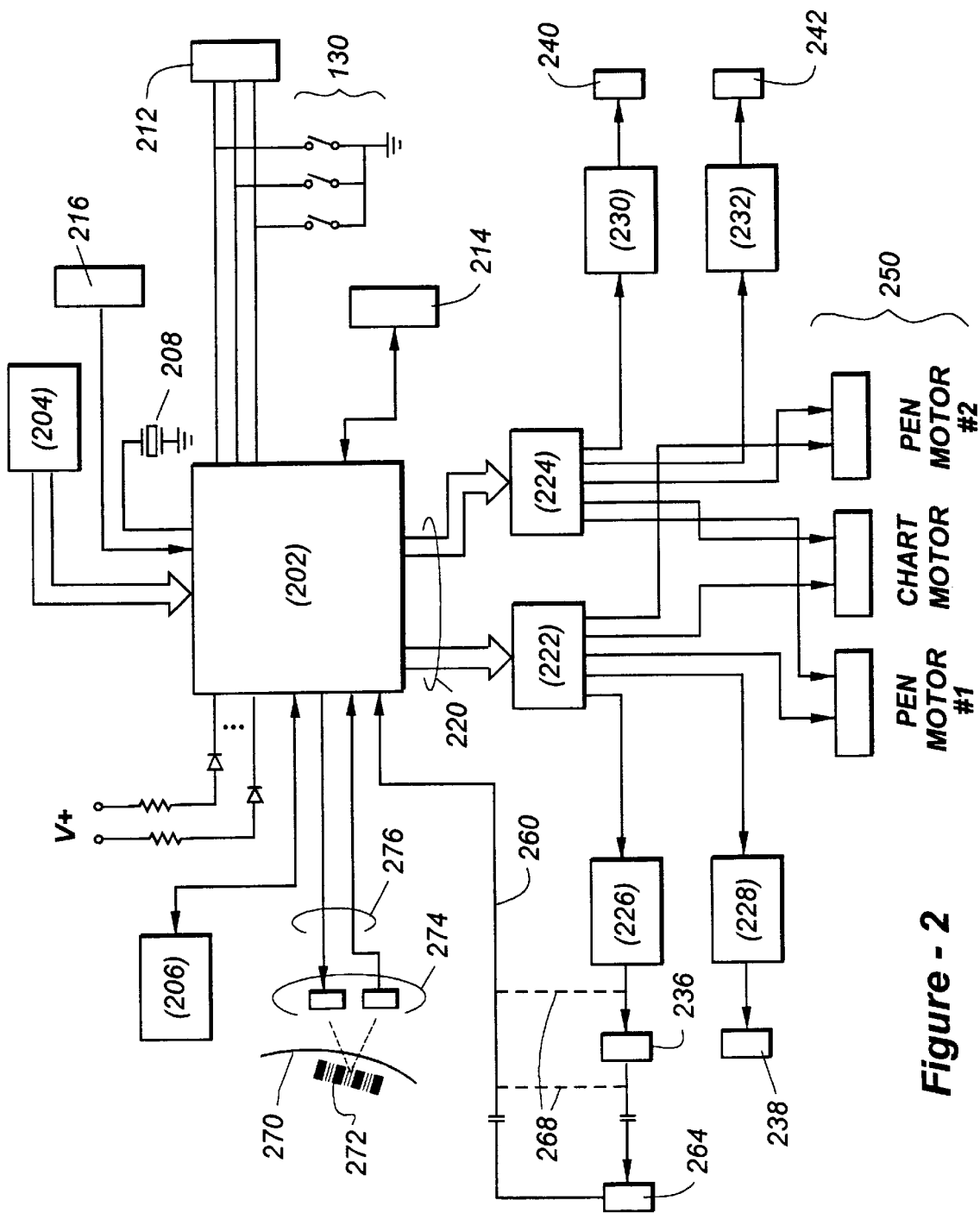
FIG. 2 is a block diagram of a portion of a combined chart recorder/controller according to the invention.

Now turning to FIG. 2, there is shown a block diagram of an instrument according to the invention, emitting certain sections which are not pertinent, or which may be common to units already in existence such as power supplies, analog pen drivers, and so forth.

Overall, this system is preferably controlled by a central microprocessor or microcomputer 202 of conventional design, which may include "on-board" random-access or read-only memories, as appropriate. In the embodiment shown, a ROM 204 is used to store a software program according to the invention to bring about, in conjunction with hardware described below, the various functions described herein. Preferably, set point data is contained in a non-volatile memory of some form, such as electrically erasable programmable read-only memory (EEPROM) 206. A crystal 208 is used in conjunction with an oscillator to provide timing to the processor 202.

Switches 130 are coupled to the processor 202 as shown, and a connector 212 is optionally provided so that the switch contacts may be carried outside of the instrument to perform other functions. Preferably, the switches 130 are of the membrane type for easy cleaning and maintenance, but any other suitable alternative may also be used. A separate I/O port 214 is also provided, and makes direct connection to the processor 202 as shown to provide one of a variety of auxiliary functions, including remote control programming of the processor 202, the communication of set point information to an external device, and other I/O functions, as appropriate. A pen arm sensor 216 is also depicted in block diagram form.

The processor 202 communicates via buses 220 to a pair of driver chips 222 and 224, respectively, which may be of conventional design. These drivers, of which there may be more or fewer, in turn communicate with relays 226, 228, 230 and 232. Each relay, in turn, provides an output such as 236, 238, 240 and 242. The drivers 222 and 224 also provide outputs 250 to the motors for one or more pens and to the chart motor.

To more faithfully monitor and ensure that a particular output, indeed, resulted in the activation of a particular device or piece of equipment to be controlled, a monitor signal may be delivered to the processor 202, for example, along line 260 from equipment 264, having been controlled by output 236 in this case. Although such feedback as to the operation of device 264 may be looped back to the processor 202 at earlier stages, as indicated by broken lines 268, in the preferred embodiment, the sensor monitoring the behavior of device 264 is placed as closely as possible to the device 264 itself in an attempt to provide the most reliable feedback.

As yet a further option according to the invention, a chart 270 may be provided with a machine-readable code 272, which may be a barcode or other appropriate indicia, and the system may be adapted to include means 274 for reading this code and inputting information in response along lines 276 to the CPU 202. It will be apparent to one of skill and machine-readable symbology, that the code 272 may not only be of varying composition, but additionally may be placed anywhere on the chart so long as the sensor(s) 274 are capable of detecting the code and delivering an electrical signal representative of the code to the CPU 202 along lines 276. Thus, the code 272 may be formed discretely, including in repetitive fashion, or, alternatively, may be read on a more or less continuous basis, thus minimizing the need to rotate or move the chart in order to find the code, In addition, although the code may be placed on the printed side of the paper, in the preferred embodiment, it is placed on the opposing or underside of the paper, enabling the sensor(s) to be conveniently located just beneath a panel of the recorder onto which the chart ordinarily rests. The code 272 may be used to record any number of attributes associated with the chart, including paper type, date of manufacture, and so on, in the preferred embodiment, the code 272 is used to encode resolution information, to ensure that, even in the event that an individual has placed the correct paper (of the same size, for example), onto the recorder, the movement of the pen motors through outputs 250 will be adjusted in accordance with the scaling factor determined by the CPU 202 to guarantee a correctly marked chart, where possible. For example, referring again to FIG. 1, if the system is "expecting" paper of the type shown in the figure, that is, with gradations of from −42+100, and an operator incorrectly loads paper of the same size with, say, gradations ranging from 0 to 100, the system will automatically adjust for that discrepancy by virtue of the markings 272, and record onto the chart according without error.

I claim:

1. A chart recorder, comprising:
   an first input to receive an electrical signal indicative of a variable to be monitored;
   means for receiving a chart having a scale in a first dimension;
   means for moving the chart in a second dimension;
   marking means for placing visual indicia onto the chart;
   an operator control; and
   a controller in electrical communication with the first input, the means for moving the chart, and the operator control, the controller being programmed to perform the following functions:

move the marking means in the first dimension in response to the operator control until reaching a point on the scale which corresponds to a set point value, and place visual indicia onto the chart at the set point value.

2. The chart recorder of claim 1, wherein the second dimension is time.

3. The chart recorder of claim 1, wherein the chart is circular.

4. The chart recorder of claim 1, wherein the chart further includes a machine-readable code containing chart-related information including scale resolution, and wherein the controller also performs the following functions:

detect and interpret the machine-readable code, and adjust the movement of the marking means in the first dimension so that the first dimension is compatible with the scale resolution.

5. The chart recorder of claim 1, further including an output providing an electrical signal to The controller.

6. The chart recorder of claim 5, further including a second input to receive an electrical signal representative of the operation of the controller in response to the output.

7. An integrated chart recorder and device controller, comprising:

an first input to receive an electrical signal indicative of a variable to be monitored and controlled;

means for receiving a circular chart including a center and a scale defined by a plurality of concentric circles about the center;

means for rotating the chart in both clockwise and counter-clockwise directions;

marking means for placing visual indicia onto the chart;

an operator control; and a controller in electrical communication with the first input, the means for moving the chart, and the operator control, the controller being programmed to perform the following functions:

move the marking means in the first dimension in response to the operator control until reaching a point on the scale which corresponds to a set point value, and place visual indicia onto the chart at the set-point value.

8. The chart recorder of claim 7, wherein the controller is programmed to place visual indicia onto the chart at the set-point value by rotating the paper with the marking means positioned at the set-point value.

9. The chart recorder of claim 8, wherein the paper is rotated through a small angle to produce a short line segment at the set-point value.

10. The chart recorder of claim 8, wherein the paper is rotated to produce a full circle at the set-point value.

11. The chart recorder of claim 7, further including an output providing an electrical signal to the controller.

12. The chart recorder of claim 11, further including a second input to receive an electrical signal representative of operation of the controller in response to the output.

13. The chart recorder of claim 7, wherein the chart further includes a machine-readable code containing chart-related information including scale resolution, and wherein the controller also performs the following functions:

detect and interpret the machine-readable code, and adjust the movement of the marking means in the first dimension so that the first dimension is compatible with the scale resolution.

14. A chart recorder, the method of indicating a set-point value onto the chart, comprising the steps of:

moving a marking means across the chart while the chart is stationary until the set-point value is reached; and moving the chart with the marking means stationary to provide visual indicia on the chart at the set-point value.

* * * * *